UNITED STATES PATENT OFFICE.

ROBERT HOCHSTETTER, OF CINCINNATI, OHIO, ASSIGNOR TO THE AULT & WIBORG CO., OF CINCINNATI, OHIO, A CORPORATION OF OHIO.

NOVEL COLORED MIMEOGRAPH-INK AND PROCESS FOR PRODUCING SAME.

1,198,441.      Specification of Letters Patent.     Patented Sept. 19, 1916.

No Drawing.     Application filed February 4, 1914. Serial No. 816,488.

*To all whom it may concern:*

Be it known that I, ROBERT HOCHSTETTER, a citizen of the United States, and a resident of Cincinnati, in the county of Hamilton and State of Ohio, have invented certain new and useful Improvements in Novel Colored Mimeograph-Inks and Processes for Producing Same; and I do hereby declare that the following is a full, clear, and exact description thereof.

This invention relates to a novel colored mimeograph ink and to the process for producing the same. The ink is designed particularly for use on a mimeograph or like machine, and especially for use on an oscillating or rotary mimeograph, and is intended to overcome certain disadvantages to be found in the mimeograph inks described in Letters Patent of the United States Nos. 928,195 and 928,450, heretofore granted to me on the 20th day of July, 1909.

The invention consists of the matters hereinafter described and more particularly pointed out in the appended claims.

One of the disadvantages of my prior patented inks resides in the fact that when exposed to the atmosphere, the ink, containing glycerin, will absorb moisture, so that when exposed in damp weather or in places where a moist temperature maintains, the ink becomes thin in body and tinctorially weak. As a result, the print made will be broad and weak in character and the letters will lack that degree of sharpness desirable in order to make the work on the mimeograph approximate the appearance of good work on a typewriting machine; which is the end aimed at in mimeograph work. In addition, in the case of the said prior ink, if an inked pad were allowed to remain on the mimeograph machine, the moisture absorbed by the ink would attack and corrode the cylinder with the result that in a comparatively short time the holes in the cylinder would become entirely plugged up, so as to prevent the pad from feeding the ink continuously through the stencil.

In making my improved ink, I take a colored pigment or lake color such as purple or blue lake and grind the pigment in a mineral oil of 18° Bé. The oil should have tack or viscosity just sufficient to draw the pigment through the stencil, preferably a specific viscosity of 1.6. To the ink thus made is added Turkey red oil or other sulfonated oil. The Turkey red or other sulfonated oil causes the ink to set rapidly so as to obtain a great many copies without smudging or offsetting when the printed sheets fall one upon another, and also tends to prevent lateral spreading of oil in the paper, thus reducing the oily outline to a minimum about the printed characters produced by the mimeograph in the use of the ink.

To illustrate by a specific example how to make my improved ink, I proceed as follows: I take 18 pounds of purple B. B. lake and 30 pounds of mineral oil of 18° Bé. and having a specific viscosity of 1.6. (Purple B. B. lake is composed of methyl violet 6-B which is a chemical name for this dye stuff which has been precipitated by means of tannic acid on a lake white base; methyl violet 6-B is benzylpentamethyl-pararosanilin hydrochlorid: $C_{31}H_{34}N_3Cl$.) This is mixed and ground. To the ground mixture, I add 80 pounds of some mineral oil, as for example, mineral oil like that first called for, and 5 pounds of Turkey-red oil of 56% and thoroughly mix. This completes the process of making the ink. To still further reduce the oily rim which may appear about the printed characters in the use of the above described ink when it stands for a day or so, I add to the ink as above prepared, a small proportion of linseed varnish. The linseed varnish has a tendency to produce sharp work. No more linseed varnish than is necessary should be used and in no case should enough be added to cause the ink to skin on the pad when the machine is allowed to stand inked for a week.

The improved ink, as appears from the above description, is an oil ink as distinguished from the inks described in the above referred to prior patents, which may be called glycerin inks. Being free from glycerin, the improved ink is not hydroscopic and will, therefore, not be affected by the moisture in the atmosphere. The ink produced is capable of remaining moist in the pad for weeks at a time and of feeding continuously through the pad while at the same time it will not gum or thicken upon exposure to the air. It will set rapidly even on hard surfaced paper,—such as bond paper—and will adhere to the paper so strongly that it cannot be rubbed after the print has stood over night. The ink flows freely without the slightest tendency to take on a buttery body, and yet the oily outline, which may appear on thin paper when the printed sheet is held to the light, is reduced to a minimum. The ink is of such construction that it will not affect either the cylinder or the stencil, will not settle when standing in the can and always remains in the same condition without any chemical reaction between the constituent parts. With all these characteristics, it is capable of producing a clear, sharp print of a bright shade approximating that of good typewriter work.

I claim as my invention:—

1. The process of producing a colored ink for mimeographs and the like, consisting in grinding a colored pigment or lake color in a mineral oil and then adding Turkey-red oil.

2. A colored ink for mimeographs and the like, comprising a colored pigment or lake color, mineral oil and a sulfonated oil.

3. A colored ink for mimeographs and the like, comprising a colored pigment or lake color, mineral oil, Turkey-red oil and a little linseed varnish.

In testimony, that I, claim the foregoing as my invention I affix my signature in the presence of two witnesses, this 26th day of January A. D. 1914.

ROBERT HOCHSTETTER.

Witnesses:
M. S. HOLTZINGER,
C. WILSON FOSHAY.